(12) United States Patent
Shaheen

(10) Patent No.: US 7,260,412 B2
(45) Date of Patent: Aug. 21, 2007

(54) WIRELESS COMMUNICATION METHOD AND SYSTEM FOR ESTABLISHING A MULTIMEDIA MESSAGE SERVICE OVER A WLAN

(75) Inventor: Kamel M. Shaheen, King of Prussia, PA (US)

(73) Assignee: InterDigital Technology Corporation, Wilmington, DE (US)

( * ) Notice: Subject to any disclaimer, the term of this patent is extended or adjusted under 35 U.S.C. 154(b) by 0 days.

(21) Appl. No.: 11/153,207

(22) Filed: Jun. 15, 2005

(65) Prior Publication Data

US 2006/0025133 A1 Feb. 2, 2006

Related U.S. Application Data

(60) Provisional application No. 60/592,856, filed on Jul. 30, 2004.

(51) Int. Cl.
*H04Q 7/20* (2006.01)
*H04Q 7/24* (2006.01)
*H04M 7/22* (2006.01)

(52) U.S. Cl. ............... 455/466; 455/414.1; 455/426.1; 370/338

(58) Field of Classification Search ............... 455/466, 455/445; 370/338
See application file for complete search history.

(56) References Cited

U.S. PATENT DOCUMENTS

| | | | |
|---|---|---|---|
| 6,947,738 B2 | 9/2005 | Skog et al. | |
| 6,956,832 B1 * | 10/2005 | Muhonen et al. | ........... 370/310 |
| 7,046,998 B2 * | 5/2006 | Verma et al. | ............... 455/418 |
| 2003/0182431 A1 * | 9/2003 | Sturniolo et al. | ........... 709/227 |
| 2004/0039782 A1 * | 2/2004 | Reddy et al. | ............... 709/205 |

(Continued)

FOREIGN PATENT DOCUMENTS

WO 99/66746 12/1999

(Continued)

OTHER PUBLICATIONS

Third Generation Partnership Project; "Technical Specification Group Services and System Aspects; Support of SMS and MMS Over Generic 3GPP IP Access"; Release 7, 3GPP TR 23.804 V1.2.0, Apr. 2005.

(Continued)

*Primary Examiner*—Charles N. Appiah
*Assistant Examiner*—Olivia Marsh
(74) *Attorney, Agent, or Firm*—Volpe and Koenig, P.C.

(57) ABSTRACT

A wireless communication system for supporting multimedia services (MMS) provided to a user of a wireless transmit/receive unit (WTRU) which communicates with the wireless communication system. The wireless communication system includes a third generation partnership program (3GPP) universal mobile telecommunications system (UMTS), a wireless local area network (WLAN) and an MMS server. The MMS server stores at least one MMS message for the WTRU in a memory until the WTRU retrieves the message. The 3GPP UMTS includes an internet protocol short message gateway (IP-SM-GW) having a short message service (SMS) proxy. The WTRU is registered with the SMS proxy to establish SMS connectivity, and is also registered with the MMS server to establish MMS connectivity. The WTRU is notified when the MMS server receives an MMS message for the WTRU. The WTRU then retrieves the MMS message from the memory of the MMS server.

22 Claims, 4 Drawing Sheets

U.S. PATENT DOCUMENTS

2005/0002407 A1    1/2005    Shaheen et al.

FOREIGN PATENT DOCUMENTS

WO    2004/099919    11/2004

OTHER PUBLICATIONS

Third Generation Partnership Project, "Technical Specification Group Services and System Aspects; 3GPP System to Wireless Local Area Network (WLAN) Interworking; System Description"; 3GPP TS 23.234 V6.0.0 (Release 6), Mar. 2004.

3rd Generation Partnership Project; Technical Specification Group Services and System Aspects; 3GPP System To Wireless Local Area Network (WLAN) Interworking; System Description (Release 6), 3GPP TS 23.234 V6.4.0 (Mar. 2005).

3rd Generation Partnership Project; Technical Specification Group Services and System Aspects; 3GPP System To Wireless Local Area Network (WLAN) Interworking; System Description (Release 6), 3GPP TS 23.234 (V6.0.0 (Mar. 2004).

3rd Generation Partnership Project; Technical Specification Group GSM/EDGE Radio Access Network; Generic Access To The AGb Interface; Stage 2 (Release 6), 3GPP TS 43.318 V6.0.0 (Jan. 2005).

Unlicensed Mobile Access (UMA); Architecture (Stage 2); UMA Architecture (Stage 2) R1.0.4 (May 2, 2005).

* cited by examiner

WIRELESS COMMUNICATION METHOD AND SYSTEM FOR ESTABLISHING A MULTIMEDIA MESSAGE SERVICE OVER A WLAN

CROSS REFERENCE TO RELATED APPLICATION(S)

This application claims the benefit of U.S. Provisional Application No. 60/592,856, filed Jul. 30, 2004, which is incorporated by reference as if fully set forth herein.

FIELD OF INVENTION

The present invention is related to a wireless communication system including at least one wireless transmit/receive unit (WTRU), a Third Generation Partnership Project (3GPP) universal mobile telecommunications system (UMTS), a multimedia service (MMS) server and a wireless local area network (WLAN). More particularly, the present invention enables the WTRU to register with the 3GPP UMTS and the MMS server such that the WTRU may retrieve MMS messages from the MMS server over the WLAN.

BACKGROUND

The implementation of WLANs in wireless communication systems has expanded dramatically to replace wired computer networks. Using a WLAN, an end user may gain benefits such as flexibility and freedom of movement. The WLANs provide faster bit rates and are cheaper because they operate on an unlicensed band. Additionally, the current WLAN architecture lacks the ability and mechanisms to page the WTRU to ensure its presence for the delivery of Internet-based services.

Existing 3GPP UMTS systems provide WTRU users with access to Internet-based services such as MMS. MMS is a store-and-forward method of transmitting graphics, video clips, sound files and short text messages, (i.e., emails), over wireless networks. It is desirable to implement a wireless communication system which provides 3GPP-based services using a WLAN interworking with a 3GPP system.

SUMMARY

The present invention is implemented in a wireless communication system for supporting MMS over a 3GPP UMTS interworking with a WLAN. The 3GPP UMTS includes a short message service—service center (SMS-SC), an SMS-gateway mobile switching center (SMS-GMSC)/SMS-interworking mobile switching center (MSC) (SMS-IWMSC), a home location register (HLR)/home subscriber server (HSS), an authentication, authorization, and accounting (AAA) server, an IP short message gateway (IP-SM-GW) having an SMS proxy and access to an IP address database, and a packet data gateway (PDG). The 3GPP UMTS and WLAN access an MMS server via the Internet.

A WTRU establishes an SMS tunnel connection between the 3GPP UMTS and the WLAN via the IP-SM-GW and the packet data gateway (PDG). The SMS tunnel connection is established to support MMS over the WLAN. The WTRU registers with the SMS Proxy within the IP-SM-GW to establish SMS connectivity. The WTRU also registers with the MMS server and provides its mobile station international ISDN number (MSISDN), (i.e., telephone number). When an MMS message is received by the MMS server, the MMS server sends an SMS message to the WTRU via the WLAN using its MSISDN. The MMS server stores the MMS message in a memory until the WTRU retrieves it. The SMS message informs the user of the WTRU that an MMS message has been received. The user of the WTRU accesses an associated MMS account and retrieves the MMS message.

BRIEF DESCRIPTION OF THE DRAWINGS

A more detailed understanding of the invention may be had from the following description of a preferred embodiment, given by way of example, and to be understood in conjunction with the accompanying drawings, wherein.

DETAILED DESCRIPTION OF THE PREFERRED EMBODIMENTS

Hereafter, the terminology "WTRU" includes but is not limited to a user equipment (UE), a mobile station, a fixed or mobile subscriber unit, a pager, or any other type of device capable of operating in a wireless environment.

Figure 1:
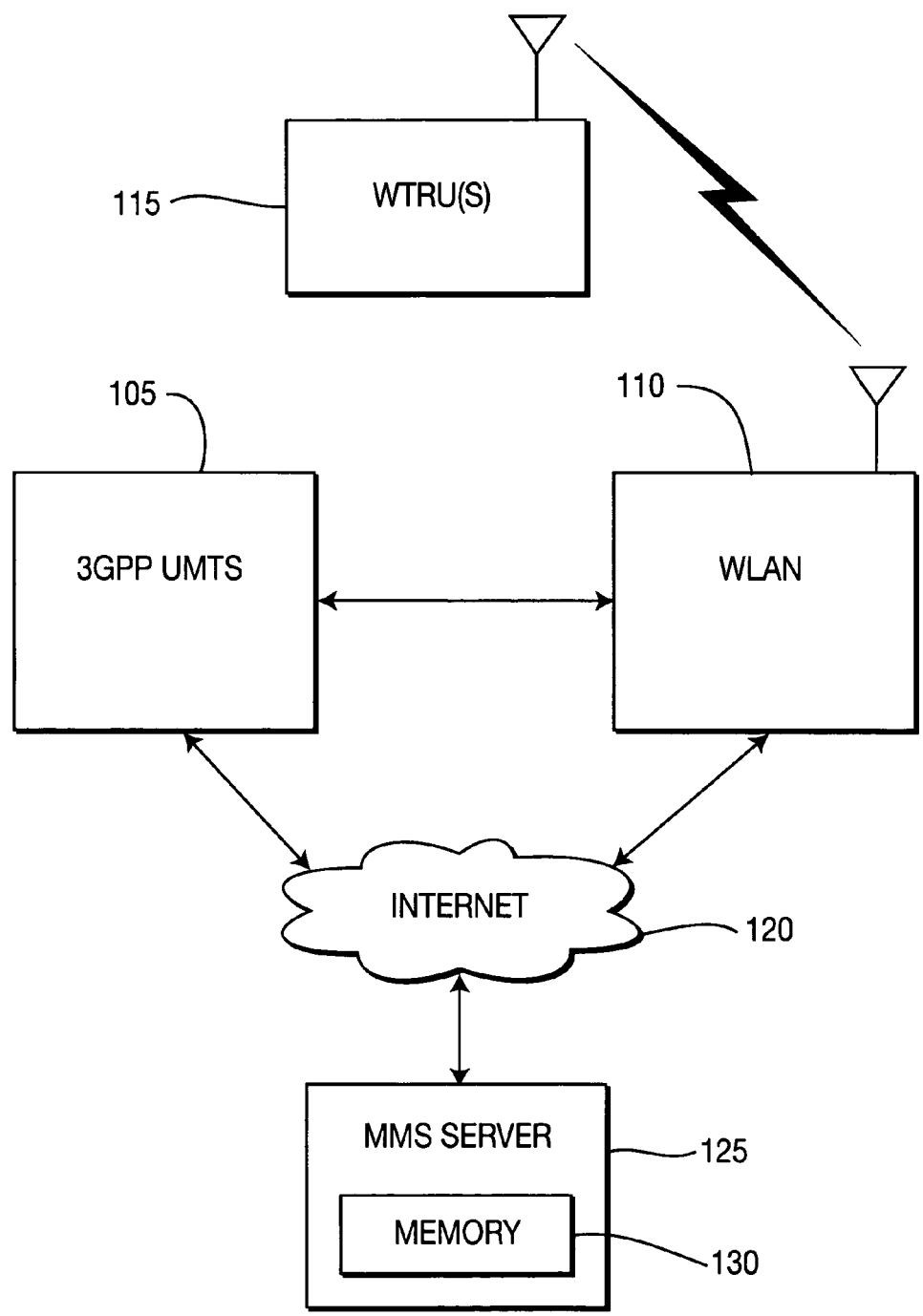
FIG. 1 is a block diagram of a wireless communication system including a 3GPP UMTS interworking with a WLAN in accordance with the present invention.

The present invention is implemented in a wireless communication system 100 for supporting MMS, as shown in FIG. 1. The wireless communication system 100 includes a 3GPP UMTS 105, a WLAN 110 and at least one WTRU 115 which establishes MMS connectivity by registering with an MMS server 125 over the Internet 120 in accordance with the present invention. The MMS server 125 includes a memory 130 for storing MMS messages accessible by the WTRU 115.

Figure 2:
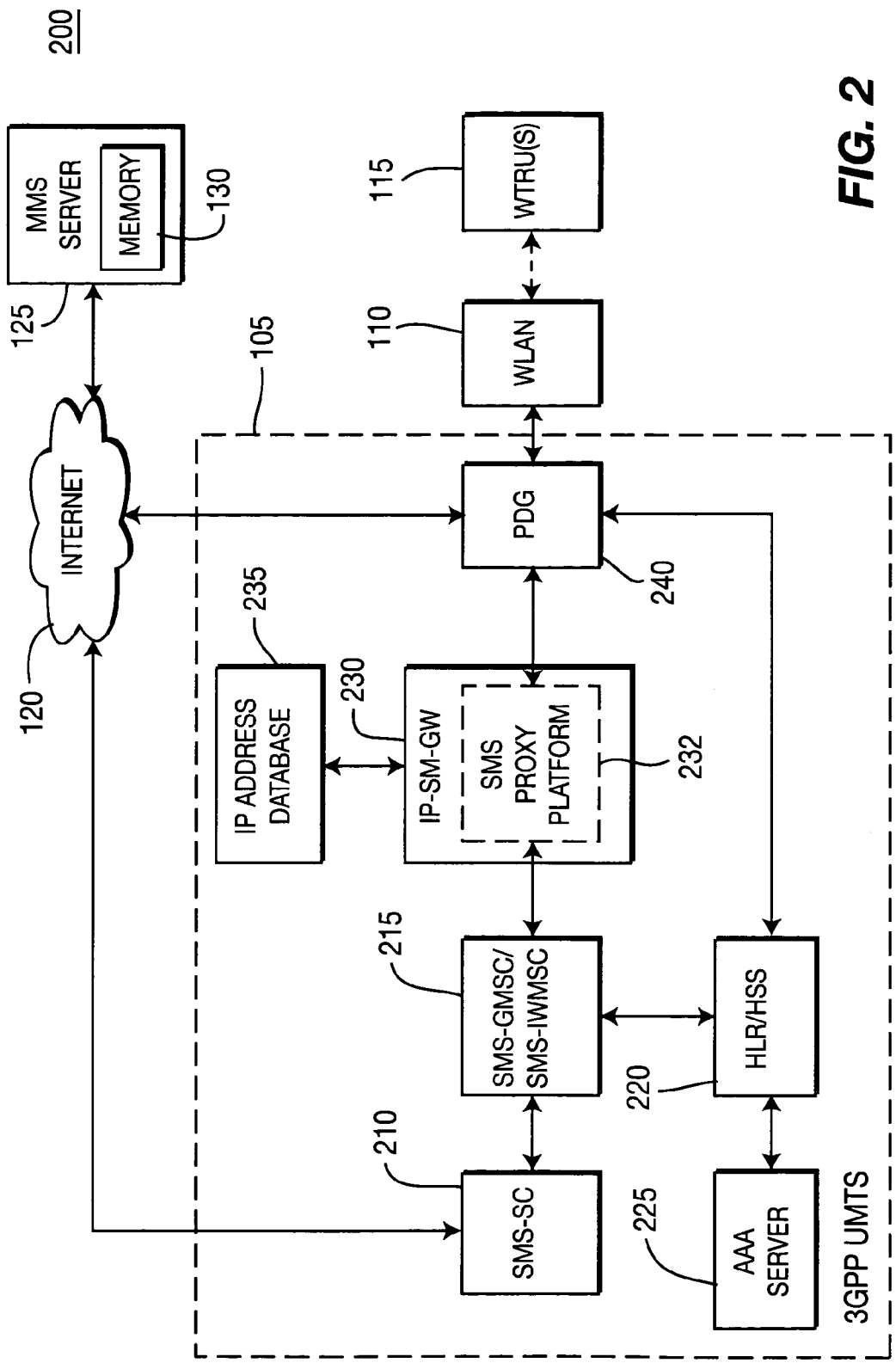
FIG. 2 is a detailed block diagram of the wireless communication system of FIG. 1.

FIG. 2 is a block diagram of a wireless communication system 200 which supports MMS in accordance with the present invention. The system 200 includes a 3GPP UMTS 105 including an SMS-SC 210 which provides multimedia services via the Internet 120, an SMS-GMSC/SMS-IWMSC 215, an HLR/HSS 220, an AAA server 225, an IP-SM-GW 230 having an SMS proxy platform 232 and access to an IP address database 235, and a PDG 240.

The SMS-GMSC/SMS-IWMSC 215 has two functions: an SMS-GMSC function and an SMS-IWMSC function. The SMS-GMSC function receives a short message and interrogates the HLR/HSS 220 for routing information. The SMS-IWMSC function forwards short messages received from the WTRU 115 to the SMS-SC 210 and the MMS server 125 via the Internet 120.

The WLAN 110 provides MMS to at least one WTRU 115. The HLR/HSS 220 communicates with the AAA server 225 which stores information relating to which WTRUs can access the WLAN 110, what services the WTRUs 115 are permitted to use, and accounting records for each WTRU 115. Further details of HLR/HSS/AAA operation may be found in co-pending application Ser. No. 11/112,503 entitled "REPORTING TERMINAL CAPABILITIES FOR SUP- PORTING SHORT MESSAGE SERVICE," which was filed on Apr. 22, 2005, and is incorporated by reference as if fully set forth herein.

Figure 3:
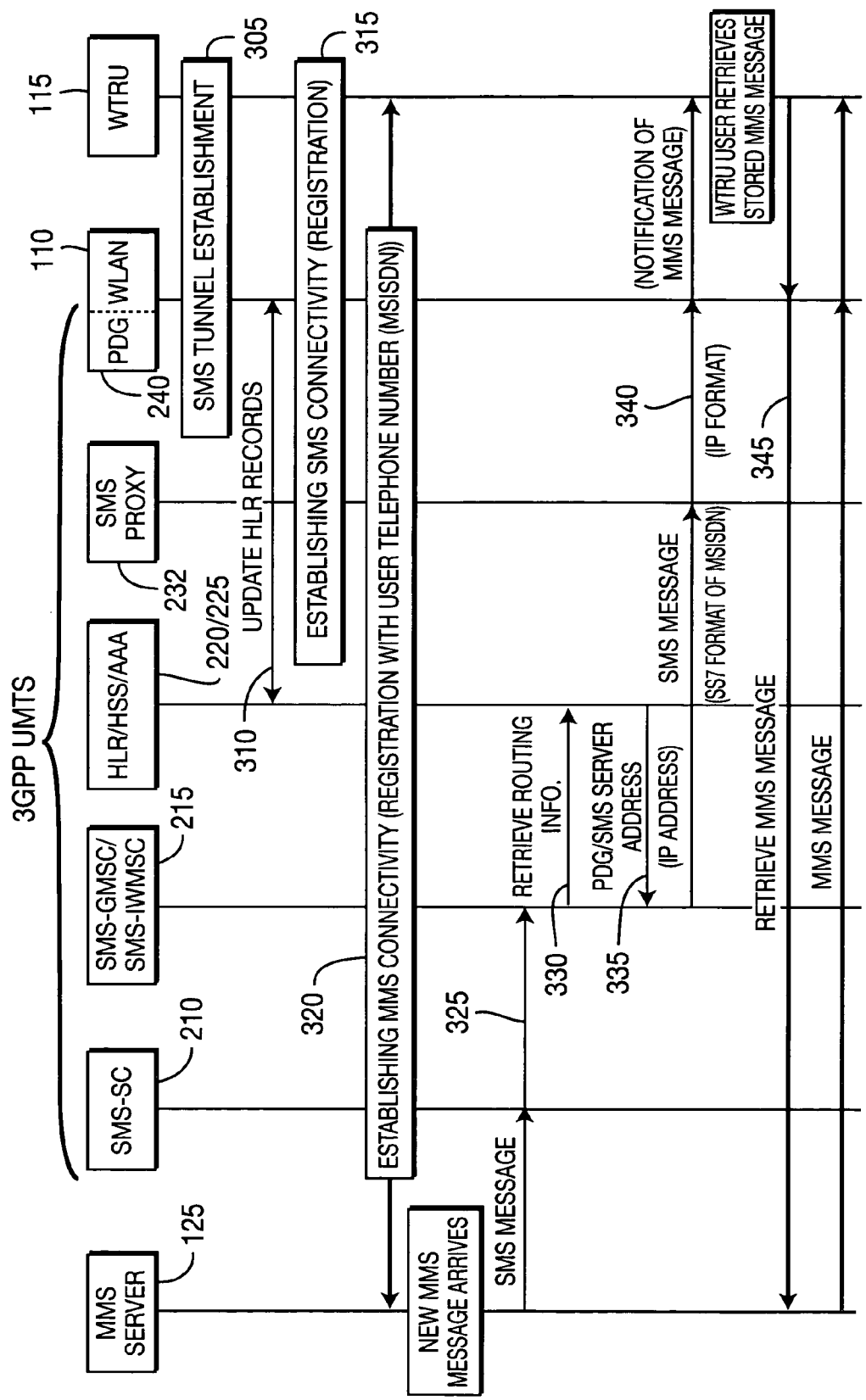
FIG. 3 is a flow diagram of a method for establishing MMS over a WLAN by providing a WTRU user's telephone number when registering with a MMS server in accordance with one embodiment of the present invention.

FIG. 3 is a flow diagram of a process including method steps for establishing MMS over a WLAN 110 by a user providing the telephone number of the WTRU 115 when registering with the MMS server 125 in accordance with one embodiment of the present invention. In step 305, an SMS tunnel connection is established through the WTRU 115, the WLAN 110 and the PDG 240. In step 310, the records of the HLR 220 are updated. The HLR 220 has access to information needed to locate the WTRU 115 and how to route the incoming MMS service. When the WTRU 115 is registered to receive its SMS and MMS services via the WLAN 110, the HLR/HSS 220 returns the address of the IP-SM-GW 230 to the SMS-GMSC/SMS-IWMSC 215 in response to receiving a query from the SMS-GMSC/SMS-IWMSC 215 regarding the location of the WTRU 115 specified by the MSISDN included in an SMS message sent by the MMS server 125 to the SMS-SC 210 via the Internet 120.

In step 315, the WTRU 115 is registered with the SMS proxy 232 to establish SMS connectivity. In step 320, the WTRU is registered with the MMS server 125 to establish MMS connectivity. The user of the WTRU 115 may provide a telephone number, (i.e., MSISDN), associated with the WTRU 115 to the MMS server 125. When a new MMS message arrives at the MMS server 125, the MMS server 125 sends an SMS message to the WTRU 115 alerting the user of the WTRU 115 that there is an MMS message awaiting retrieval at the MMS server 125 (steps 325 and 340). The SMS message is routed by retrieving routing information, (i.e., the PDG/SMS server address (IP address) associated with the WTRU 115), from the HLR/HHS 220 and/or the AAA server 225 (steps 330, 335). In step 345, the WTRU 115 retrieves the MMS message from the memory 130 of the MMS server 125.

Figure 4:
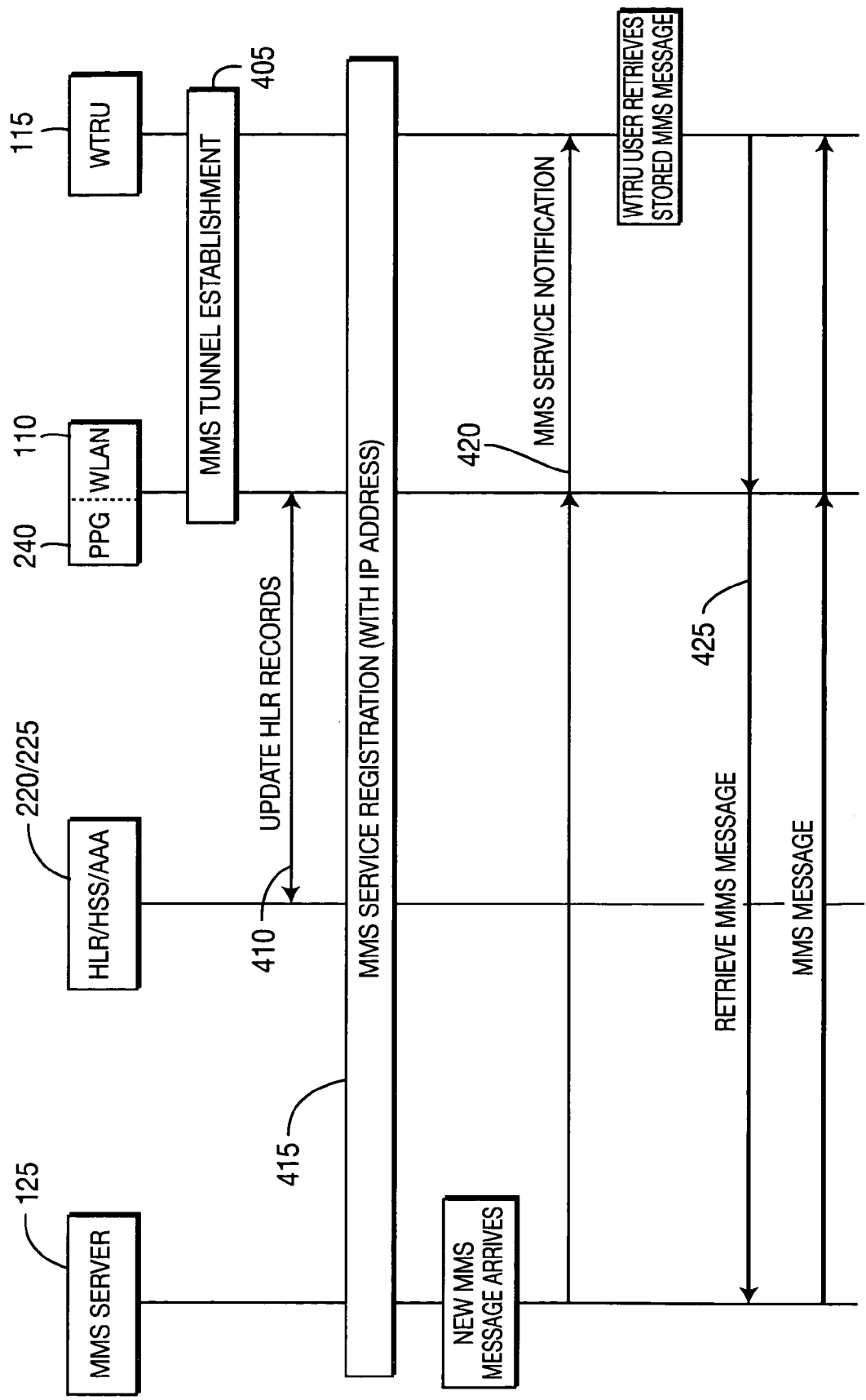
FIG. 4 is a flow diagram of a method for establishing MMS over a WLAN by providing a WTRU user's IP address when registering with an MMS server in accordance with another embodiment of the present invention.

FIG. 4 is a flow diagram of an IP process including method steps for establishing MMS over a WLAN 110 by providing a WTRU user's IP address when registering with the MMS server 125 in accordance with another embodiment of the present invention. In step 405, an MMS tunnel connection is established between the WTRU 115 and the WLAN 110. In step 410, the records of the HLR 220 are updated in a similar fashion as described with respect to step 315. In step 415, the WTRU 115 is registered with the MMS server 125 using an IP address associated with the WTRU 115. In step 420, a new MMS service is established and the user of the WTRU 115 is alerted that there is an MMS message awaiting retrieval at the MMS server 125 (step 420). In step 425, the WTRU 115 retrieves the MMS message from the memory 130 of the MMS server 125.

If the WTRU 115 remains idle for an extended period of time, the connection established between the WTRU 115 and the WLAN 110 may be terminated.

The WTRU 115 periodically registers with the SMS proxy 232 and/or the MMS server 125 to maintain the connection between the WLAN 110 and the MMS server 125.

The user of the WTRU 115 may initiate a service termination request to terminate any pending activities over the WLAN 110.

Although the features and elements of the present invention are described in the preferred embodiments in particular combinations, each feature or element can be used alone (without the other features and elements of the preferred embodiments) or in various combinations with or without other features and elements of the present invention.

What is claimed is:

1. In a wireless communication system including a packet data gateway (PDG), an authentication, authorization and accounting (AAA) server, a home location register (HLR)/home subscriber server (HSS) that is in communication with the PDG and the AAA server, a short message service (SMS) switching center, an Internet Protocol short message gateway (IP-SM-GW) having an SMS proxy platform that is in communication with the PDG, a multimedia service (MMS) server having a memory, and a wireless local area network (WLAN) that is in communication with the PDG, a method of supporting an MMS provided to a user of a wireless transmit/receive unit (WTRU) that communicates with the wireless communication system, the method comprising:

(a) establishing an SMS connection through the WTRU, the WLAN and the PDG;
(b) registering the WTRU with the SMS proxy platform to establish SMS connectivity,
(c) registering the WTRU with the MMS server to establish MMS connectivity,
(d) the MMS server receiving a new MMS message;
(e) the MMS server sending an SMS message to the SMS switching center;
(f) the SMS switching center retrieving information including at least one of an IP address and the address of the IP-SM-GW from at least one of the HLR/HSS and the AAA server;
(g) the SMS switching center routine the SMS message to the WTRU via the IP-SM-GW, the PDG and the WLAN using the retrieved information; and
(h) the WTRU retrieving the MMS message from the memory of the MMS server.

2. The method of claim 1 further comprising providing a user telephone number associated with the WTRU to the MMS server to register the WTRU with the MMS server.

3. The method of claim 1 wherein the SMS message notifies the user of the WTRU that there is an MMS message waiting to be retrieved from the memory of the MMS server.

4. The method of claim 1 further comprising establishing an MMS tunnel connection between the WTRU and the WLAN.

5. A wireless communication system for supporting a, multimedia service (MMS) provided to a user of a wireless transmit/receive unit (WTRU) that communicates with the wireless communication system, the system comprising:

(a) a packet data gateway (PDG);
(b) an authentication, authorization and accounting (AAA) server;
(c) a home location register (HLR)/home subscriber server (HSS) that is in communication with the PDG and the AAA server;
(d) a short message service (SMS) switching center;
(e) an Internet Protocol short message gateway (IP-SM-GW) having an SMS proxy platform that is in communication with the PDG;
(f) a wireless local area network (WLAN) that is in communication with the PDG; and
(g) an MMS server having a memory, wherein an SMS connection is established through the WTRU, the WLAN and the PDG, the WTRU registers with the SMS proxy platform to establish SMS connectivity and the WTRU resisters with the MMS server to establish MMS connectivity, the MMS server sends an SMS message to the SMS switching center when the MMS server receives a new MMS message, the SMS switching center retrieves information including at least one of an IP address and the address of the IP-SM-GW from at least one of the HLR/HSS and the AAA server, the SMS switching center routes the SMS message to the WTRU via the IP-SM-GW, the PDG and the WLAN using the retrieved information, and the WTRU retrieves the MMS message from the memory of the MMS server.

6. The wireless communication system of claim 5 wherein a user telephone number associated with the WTRU is provided to the MMS server to register the WTRU with the MMS server.

7. The wireless communication system of claim 5 wherein the SMS message notifies the user of the WTRU that there is an MMS message waiting to be retrieved from the memory of the MMS server.

8. The wireless communication system of claim 5 wherein an MMS tunnel connection is established between the WTRU and the WLAN.

9. The method of claim 1 wherein the SMS switching center is an SMS gateway mobile switching center (SMS-GMSC)/SMS-interworking mobile switching center (MSC) (SMS-IWMSC).

10. The method of claim 9 wherein the wireless communication system further comprises an SMS service center (SMS-SC) which is in communication with the SMS-GMSC/SMS-IWMSC, the method further comprising:
(i) the SMS-GMSC/SMS-IWMSC forwarding short messages received from the WTRU to the SMS-SC.

11. The method of claim 1 wherein the WTRU receives SMS services via the WLAN.

12. The method of claim 1 wherein the WTRU receives MMS services via the WLAN.

13. The method of claim 1 wherein the IP address is a PDG/SMS server address.

14. The system of claim 5 wherein the SMS switching center is an SMS gateway mobile switching center (SMS-GMSC)/SMS-interworking mobile switching center (MSC) (SMS-IWMSC).

15. The system of claim 14 further comprising:
(h) an SMS service center (SMS-SC) which is in communication with the SMS-GMSC/SMS-IWMSC, wherein the SMS-GMSC/SMS-IWMSC forwards short messages received from the WTRU to the SMS-SC.

16. The system of claim 5 wherein the WTRU receives SMS services via the WLAN.

17. The system of claim 5 wherein the WTRU receives MMS services via the WLAN.

18. The system of claim 5 wherein the IP address is a PDG/SMS server address.

19. In a wireless communication system including a packet data gateway (PDG), a home location register (HLR), an SMS service center (SMS-SC), a short message service (SMS) switching center, an Internet Protocol short message gateway (IP-SM-GW) having an SMS proxy platform that is in communication with the PDG, a multimedia service (MMS) server having a memory, and a wireless local area network (WLAN) that is in communication with the PDG, a method of supporting an MMS provided to a user of a wireless transmit/receive unit (WTRU) that communicates with the wireless communication system, the method comprising:
(a) providing a telephone number associated with the WTRU to the MMS server;
(b) the MMS server receiving a new MMS message;
(c) the MMS server storing the received MMS message in the memory;
(d) the MMS server sending an SMS message including a telephone number associated with the WTRU to the SMS switching center via the SMS-SC;
(e) the SMS switching center retrieving routing information from the HLR;
(f) routing the SMS message to the WTRU via the IP-SM-GW, the PDG and the WLAN using the retrieved routing information; and
(g) the WTRU retrieving the MMS message from the memory of the MMS server.

20. The method of claim 19 wherein the routing information includes at least one of a PDG/SMS server address and the address of the IP-SM-GW.

21. In a wireless communication system including a packet data gateway (PDG), a home location register (HLR), an SMS service center (SMS-SC), a short message service (SMS) switching center, an Internet Protocol short message gateway (IP-SM-GW) having an SMS proxy platform that is in communication with the PDG, a multimedia service (MMS) server having a memory, and a wireless local area network (WLAN) that is in communication with the PDG, a method of supporting an MMS provided to a user of a wireless transmit/receive unit (WTRU) that communicates with the wireless communication system, the method comprising:
(a) providing an IP address associated with the WTRU to the MMS server;
(b) the MMS server receiving a new MMS message;
(c) the MMS server storing the received MMS message in the memory;
(d) the MMS server sending an SMS message including the IP address associated with the WTRU to the SMS switching center via the SMS-SC;
(e) the SMS switching center retrieving routing information from the HLR;
(f) routing the SMS message to the WTRU via the IP-SM-GW, the PDG and the WLAN using the retrieved routing information; and
(g) the WTRU retrieving the MMS message from the memory of the MMS server.

22. The system of claim 21 wherein the routing information includes at least one of a PDG/SMS server address and the address of the IP-SM-GW.

* * * * *

UNITED STATES PATENT AND TRADEMARK OFFICE
CERTIFICATE OF CORRECTION

| | | |
|---|---|---|
| PATENT NO. | : 7,260,412 B2 | Page 1 of 1 |
| APPLICATION NO. | : 11/153207 | |
| DATED | : August 21, 2007 | |
| INVENTOR(S) | : Kamel M. Shaheen | |

It is certified that error appears in the above-identified patent and that said Letters Patent is hereby corrected as shown below:

In the claims

Claim 1, Column 4, Line 28: replace "routine" with -- routing --.

Claim 5, Column 4, Line 42: replace "supporting a," with -- supporting a --.

Claim 5, Column 4, Line 62: replace "resisters" with -- registers --.

Signed and Sealed this
Third Day of November, 2015

Michelle K. Lee
*Director of the United States Patent and Trademark Office*